(12) United States Patent
Kern et al.

(10) Patent No.: US 6,202,124 B1
(45) Date of Patent: Mar. 13, 2001

(54) DATA STORAGE SYSTEM WITH OUTBOARD PHYSICAL DATA TRANSFER OPERATION UTILIZING DATA PATH DISTINCT FROM HOST

(75) Inventors: Robert Frederic Kern; Ronald Maynard Kern; William Frank Micka; Mark Anthony Sovik, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/073,375

(22) Filed: May 5, 1998

(51) Int. Cl.[7] ................................................. G06F 12/00
(52) U.S. Cl. ........................... 711/112; 711/100; 711/147; 711/161
(58) Field of Search .................................. 711/100, 105, 711/112, 113, 114, 125, 147, 154, 161, 162

(56) References Cited

U.S. PATENT DOCUMENTS

| | | | |
|---|---|---|---|
| 5,055,999 | * 10/1991 | Frank et al. | 711/163 |
| 5,410,667 | 4/1995 | Belsan et al. | 711/162 |
| 5,586,264 | * 12/1996 | Belknap et al. | 709/219 |
| 5,668,948 | * 9/1997 | Belknap et al. | 709/231 |
| 5,712,976 | * 1/1998 | Falcon, Jr. et al. | 709/219 |
| 5,835,953 | * 11/1998 | Ohran | 711/162 |
| 5,909,540 | * 6/1999 | Carter et al. | 714/4 |
| 6,016,553 | * 1/2000 | Schneider et al. | 714/21 |

FOREIGN PATENT DOCUMENTS 57-111736  8/1982 (JP) .

OTHER PUBLICATIONS (Abstract) Tennison et al., IBM Technical Disclosure Bulletin, vol. 17, No. 9, pp. 2557–2558, Feb. 1975.*
IBM Technical Disclosure Bulletin, Feb. 1983, pp. 4719–4721, Apr. 1993.*
U.S. Patent Application No. 09/003,544, entitled "Host Storage Management Control of Outboard Data Movement", filed Jan. 6, 1998 in the names of Robert Frederic Kern et al.*
U.S. Patent Application No. 09/003,532, entitled "Host Storage Management Control of Outboard Data Movement Using Push–Pull Operations", filed Jan. 6, 1998 in the names of Robert Frederic Kern et al.*

* cited by examiner

Primary Examiner—Tuan V. Thai
(74) Attorney, Agent, or Firm—Dan Hubert & Assoc.

(57) ABSTRACT

A data storage system includes an outboard data transfer module that directs data transfer operations without requiring substantial host involvement. This subsystem includes a host computer, one or more digital data storage devices, one or more device controllers interposed between the host computer and the storage devices, and a outboard data manager coupled to the host and the device controllers. Data transfer operations are initiated when the outboard data manager receives a data transfer request from the host. The request identifies the type of operation, resulting target format, source data residing on one or more source devices, and one or more target devices. In response to this request, the outboard data manager retrieves a copy of the source data from the source device(s), formats target data according to host instruction, and then transmits the copy to the target device(s) for storage therein. Thus, source data is copied from source to target storage device(s) via the outboard data manager without burdening the host by routing data through it. Some exemplary data transfer operations include copy, migrate, recall, backup, restore, move, defragment, reorganize, and the like.

20 Claims, 4 Drawing Sheets

DATA STORAGE SYSTEM WITH OUTBOARD PHYSICAL DATA TRANSFER OPERATION UTILIZING DATA PATH DISTINCT FROM HOST

BACKGROUND OF THE INVENTION

1. Field of the Invention

The present invention relates to digital data storage systems. More particularly, the invention concerns a data storage system with an outboard data manager that performs data management operations without requiring substantial host involvement. Some exemplary data management operations include copy, migrate, move, recall, restore, defragment, reorganize, and the like.

2. Description of the Related Art

The manipulation, exchange, and storage of data are central functions in this information age. In a data storage system, there are many reasons to transfer data from one storage device to another. For example, many prudent computer users make duplicate or "backup" copies of their data to protect against data loss. Some other examples of data transfer operations are data reclamation, de-fragmentation, migration, etc. These generally involve some variation of copying data or moving data, where a data "move" entails a copy operation followed by the deletion of the source data from its original location.

To illustrate a common technique for data transfer, FIG. 1 shows a typical data storage system 100. The system 100 includes a host 102 coupled to a controller 104 and a controller 108. The host 102 includes one or more processors that manage the controllers 104, 108.

The controllers 104, 108 also include processing features, and serve to more specifically manage the operation of respective storage devices 106, 110. Namely, the controller 104 is coupled to the data storage unit 106, which contains source data to be moved or copied. The controller 108 is coupled to a second data storage unit 110, which is the destination for the data transfer operation. The storage devices 106, 110 may comprise one or more magnetic hard drives, tape drives, libraries, or other digital data storage devices.

To copy data from the source 106, the host 102 directs the controller 104 to copy source data from the device 106 and pass this data back to the host 102. The host 102 forwards the data to the controller 108, and directs the controller 108 to coordinate storage of the copied data at the target 110. In the case of a data move, the source data is deleted after verifying that the copy operation has succeeded.

Although the foregoing backup technique is used widely, and some users may find this approach to be completely satisfactory, engineers at International Business Machines are continually seeking ways to improve data storage systems. One area of possible improvement concerns the processing burden experienced by the host 102 during data transfer operations. Particularly, the host 102 must serve as a conduit between the controllers 104, 108, which actually oversee the storage and retrieval of data from the devices 106, 110. This can involve a significant burden on the input/output ("I/O") and processing capabilities of the host 102, at the expense of application programs running on the host. In most cases, these application programs are the central functions of the system 100, such as database management, mathematical modeling, financial analysis, network support, and other applications. Therefore, interruption of important processing tasks of the host 102 may be undesirable in many cases. Consequently, in some applications, known data copy and transfer systems are not completely adequate.

SUMMARY OF THE INVENTION

Broadly, the invention concerns a data storage system with an outboard data transfer module that directs data transfer operations without requiring substantial host involvement. This subsystem includes a host computer, one or more digital data storage devices, one or more device controllers interposed between the host computer and the storage devices, and a outboard data manager coupled to the host and the device controllers. In accordance with the invention, data transfer operations are initiated when the outboard data manager receives a data transfer request from the host. The request identifies source data residing on one or more source devices, the resulting format target data, and the target devices.

In response to this request, the outboard data manager retrieves a copy of the source data from the source device, formats retrieved data according to host information, and then transmits the copy to the target devices for storage therein. Thus, source data is copied from a source device to a target storage device via the outboard data manager without burdening the host by routing data through it. Some exemplary data transfer operations include copy, migrate, recall, restore, move, defragment, reorganize, and the like.

Accordingly, one embodiment of the invention relates to a method to perform data transfer operations in a data storage subsystem free from substantial host involvement. In another embodiment, the invention may be implemented to provide an apparatus, such as a data storage subsystem, including an outboard data manager, configured to perform data transfer operations free from substantial host involvement. In still another embodiment, the invention may be implemented to provide a signal-bearing medium tangibly embodying a program of machine-readable instructions executable by a digital data processing apparatus to perform method steps for performing data transfer operations in a data storage subsystem free from substantial host involvement.

The invention affords its users with a number of distinct advantages. First, the invention performs a data transfer operation without burdening the host with any substantial involvement. Consequently, the host is free to perform other tasks without delay, such as running application programs for users. Advantageously, data transfer operations performed by the invention are consistent and valid among the participating data storage devices, because the overall transfer operation is remotely overseen and verified by the host. For example, the host initiates each data transfer operation, protects the source data by serializing it, and prepares (or supervises preparation of) metadata related to the source data. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As explained in detail below, the invention concerns a data storage system with an outboard data manager that directs data transfer operations without requiring substantial host involvement. Advantageously, however, the host is still involved sufficiently to ensure that data transfer operations performed by the invention are consistent and valid among the participating data storage devices. This is because the overall transfer operation is remotely overseen and verified by the host. For example, the host initiates each data transfer operation, protects the source data by serializing it, and prepares (or supervises preparation of) metadata related to the source data.

Hardware Components & Interconnections
Data Storage Subsystem

Figure 1:
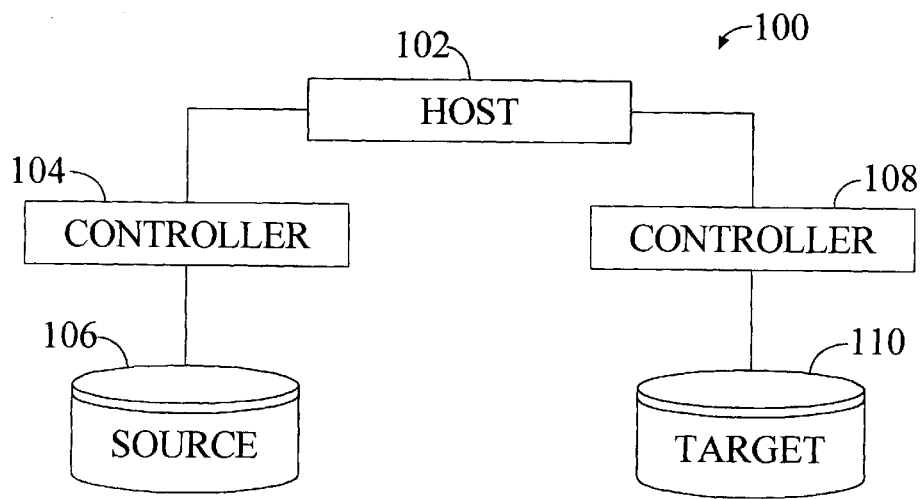
FIG. 1 is a block diagram of a conventional storage system.
Figure 2:
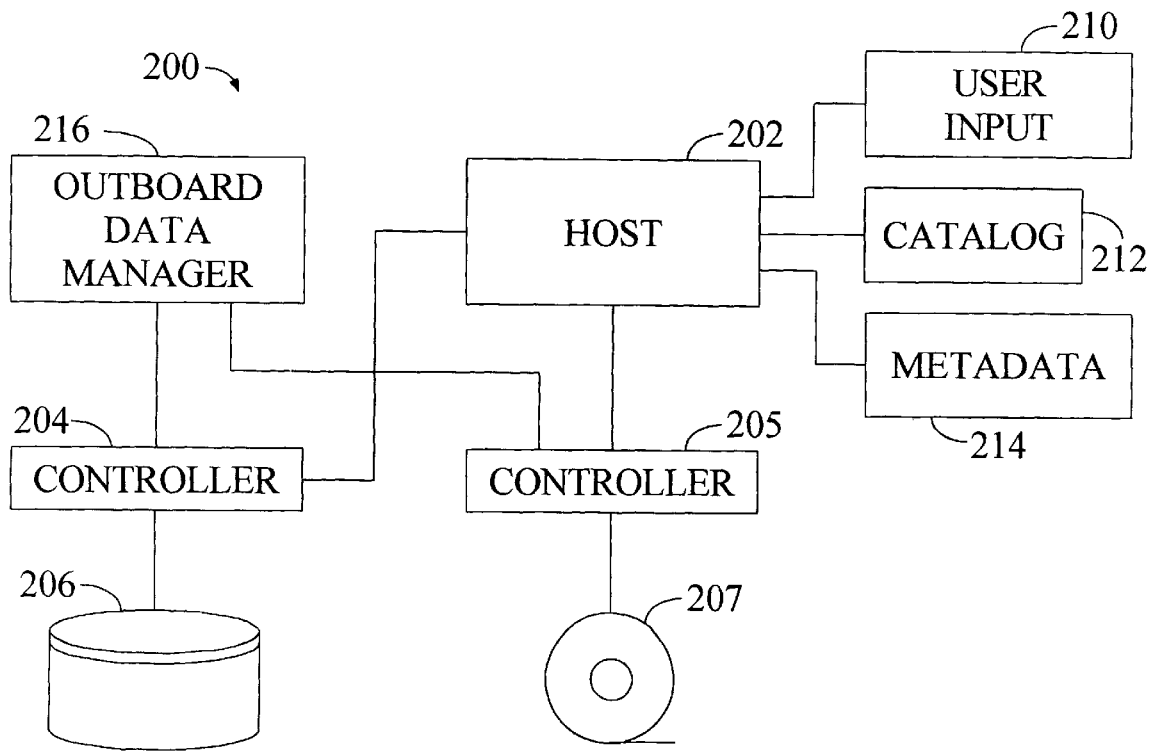
FIGS. 2, 2A–2C are block diagrams showing various arrangements of a digital data storage system with an outboard data manager that directs backup operations without requiring substantial host involvement, in accordance with the invention.

One aspect of the invention concerns a data storage subsystem, which may be embodied by various hardware components and interconnections as illustrated by the subsystem 200 of FIG. 2. Generally, the data storage subsystem 200 stores and manages digital data on behalf of various computer users, under direction of a host computer 202, referred to as a "host." The host 202 is coupled to a user input device 210, and also has access to a catalog 212 and metadata 214. The system 200 also includes multiple storage device controllers 204–205, each coupled to a respective digital data storage device 206–207. The host 202 and controllers 204–205 are also coupled to an outboard data manager 216.

The system 200 is now discussed in more detail. In many applications, the host 202 may comprise a mainframe computer such as an IBM S/390 product using the MVS operating system. However, the host 202 may comprise a variety of other digital data processing apparatuses as well, such as a personal computer, server, computer workstation, supercomputer, etc. The host 202 receives input from a system administrator or other user via the user input device 210, which includes keyboards, computer mice, and other means for humans to issue machine-readable instructions to the host 202. The catalog 212 and metadata 214 include information identifying storage locations of files stored by the storage devices 206–207 and may comprise a catalog configuration as known in many commercially available data storage systems of IBM. The catalog 212 and metadata 214 may also include various other statistics concerning stored files, such as file sizes, storage times, etc. Some or all of the information in the catalog 212 and metadata 214 may be contained in the devices 206–207, or in other storage devices as desired.

The controllers 204–205 comprise digital data processing apparatuses appropriate to their respective storage devices 206–207, and serve to direct storage, retrieval, and other management of data on these devices. The controllers 204–205 may be coupled to the host 202 by any suitable communications link, such as ESCON attachment, input/output channel, cables, wireless communication, fiber optic link, etc. The digital data storage devices 206–207 may include magnetic disk drives, magnetic tape, optical medium, or any other suitable storage media. As illustrated, the storage device 206 includes disk drive storage, and the device 207 includes magnetic tape storage. In this example, the controller 204 and storage device 206 may comprise an IBM RAMAC Virtual Array, RAMAC Scalable Array, or other suitable tape storage product. Although not shown, one or both of the controllers 204–205 may be connected to both storage devices 206–207.

As explained in greater detail below, the outboard data manager 216 oversees all data transfer operations, including intra-controller transfers as well as transfers that span multiple controllers 204–205. Data "transfer" operations include backup, copy, move, migrate, recall, restore, defragment, reorganize, etc. The manager 216 utilizes data processing capability that is physically distinct from the host 202, yet under control of the host 202. In this respect, the manager 216 comprises a digital data processing apparatus separate from the host 202. The digital data processing device used to implement the manager 216 may also be separate from the controllers 204–205. In the illustrated example, the coupling between the outboard data manager 216 and the controllers 204–205 may comprise an ESCON attachment, input/output channel, cables, wireless communication, fiber optic link, etc. As an alternative, the manager 216 may be implemented by using hardware of one of the controllers 204–205, where the manager 216 is provided by separate threads, subroutines, tasks, or other software processes separate from the functions of the controllers 204–205. This embodiment is appropriate when one of the controllers 204–205 includes sufficient processing power to perform the functions of the outboard data manager 216, as discussed below. An example of one sufficiently powerful controller is an IBM RS/6000 type machine, with an operating system such as AIX or UNIX.

Figure 2A:
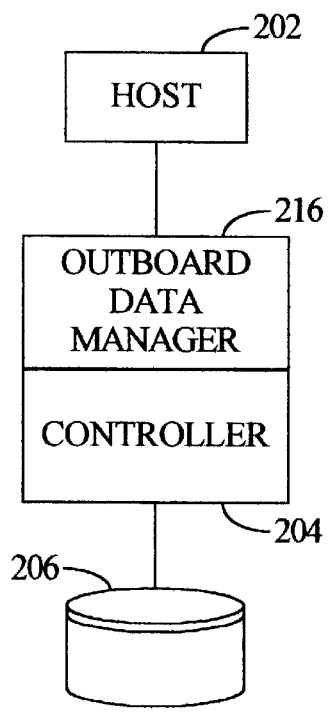
Figure 2B:
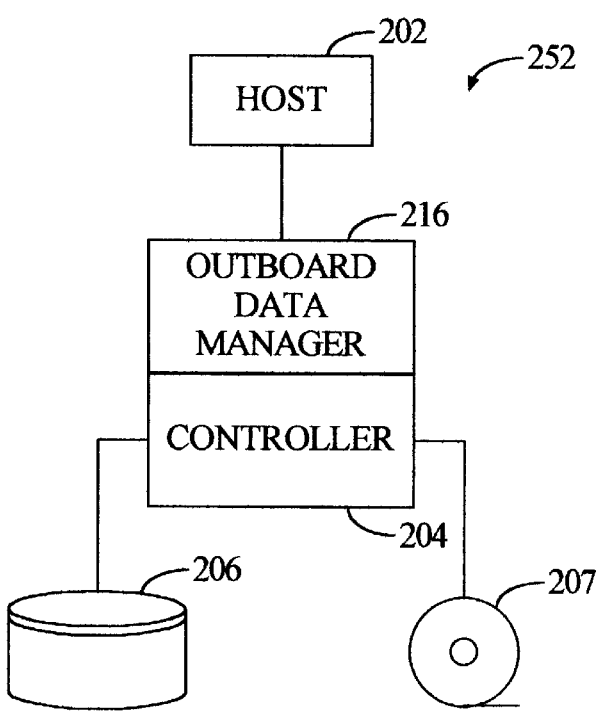
Figure 2C:
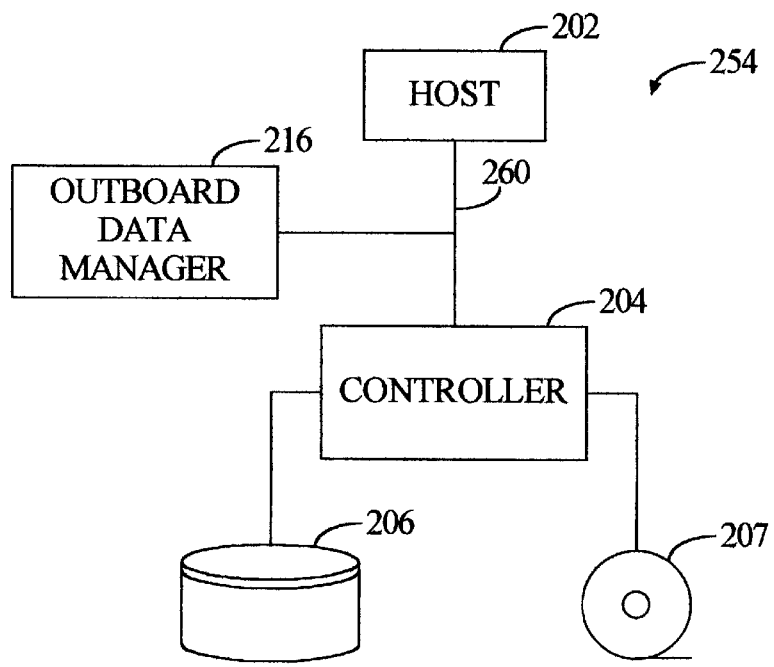

The data storage system of the invention is not limited to the particular configuration of FIG. 2, and FIGS. 2A–2C provide examples of some other illustrative hardware environments. FIG. 2A shows a system 250 where the outboard data manager 216 is incorporated into the controller 204. The controller 204 (including the outboard data manger 216) is interposed between the host 202 and a single data storage device 206. FIG. 2B shows a system 252 in which the outboard data manager 216 is also incorporated into the controller 204. However, the controller 204 is coupled to multiple storage devices 206–207. FIG. 2C shows a different system 254, in which the outboard data manager 216 is coupled to a communication link 260 between the host 202 and controller 204. As illustrated, the controller 204 is attached to multiple data storage devices 206–207.

Exemplary Digital Data Processing Apparatus

As mentioned above, the outboard data manager 216 may be provided by its own digital data processing apparatus, or by software executed by one or more digital data processing apparatus of the controllers 204–205. In either case, such an apparatus constitutes one aspect of the invention, and may be implemented by various hardware components and interconnections, as shown by the exemplary arrangement of FIG. 3. Namely, the digital data processing apparatus 300 includes a processor 302, such as a microprocessor or other processing machine, coupled to a storage 304. In the present example, the storage 304 includes a fast-access storage 306, as well as nonvolatile storage 308. The fast-access storage 306 may comprise random access memory, and may be used to store the programming instructions executed by the processor 302. The nonvolatile storage 308 may comprise, for example, one or more magnetic data storage disks such as a "hard drive," a tape drive, or any other suitable storage device. The apparatus 300 also includes an input/output 310, such as a line, bus, cable, electromagnetic link, or other means for exchanging data with the processor 302.

Despite the specific foregoing description, ordinarily skilled artisans (having the benefit of this disclosure) will recognize that the apparatus discussed above may be implemented in a machine of different construction, without departing from the scope of the invention. As a specific example, one of the components 306, 308 may be eliminated; furthermore, the storage 304 may be provided on-board the processor 302, or even provided externally to the apparatus 300.

Operation

In addition to the various hardware embodiments described above, a different aspect of the invention concerns a method for operating an outboard data manager to perform data transfer operations without requiring substantial host involvement. As discussed below, data transfer operations with the invention are still consistent, because the host remotely supervises and verifies data transfer operations. Also as discussed in greater detail below, some exemplary data transfer operations include copy, migrate, move, recall, restore, defragment, reorganize, and the like.

Signal-Bearing Media

In the context of FIG. 2, such a method may be implemented, for example, by operating the outboard data manager 216 (as embodied by a digital data processing apparatus 300) to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to perform data transfer operations without requiring substantial host involvement.

Figure 3:
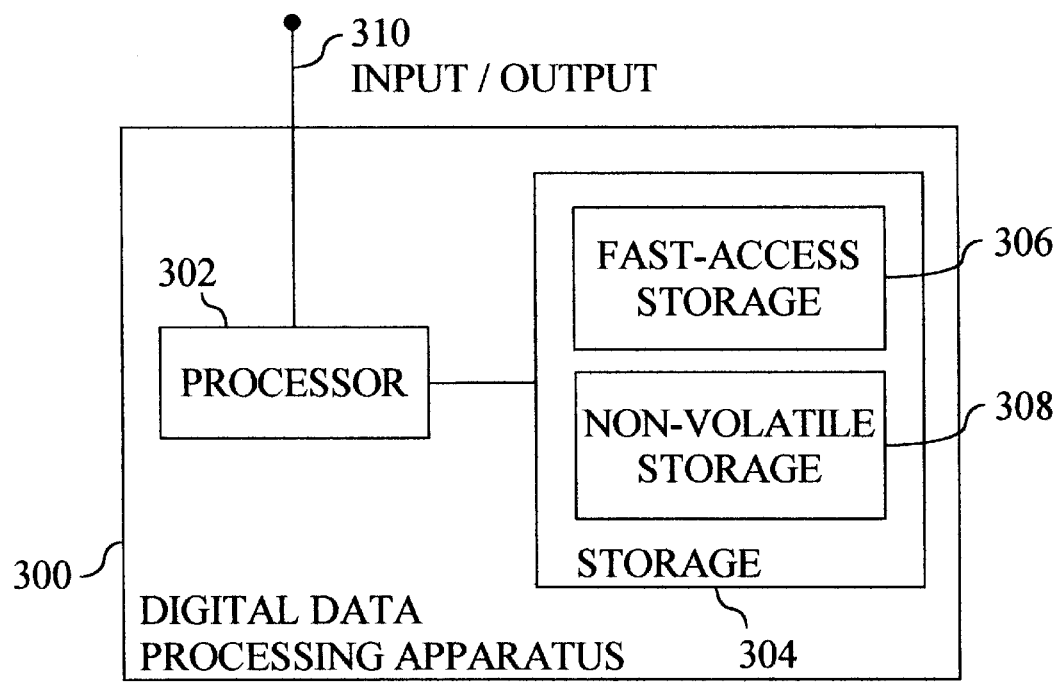
FIG. 3 is a diagram of an exemplary digital data processing apparatus, in accordance with the invention.
Figure 4:
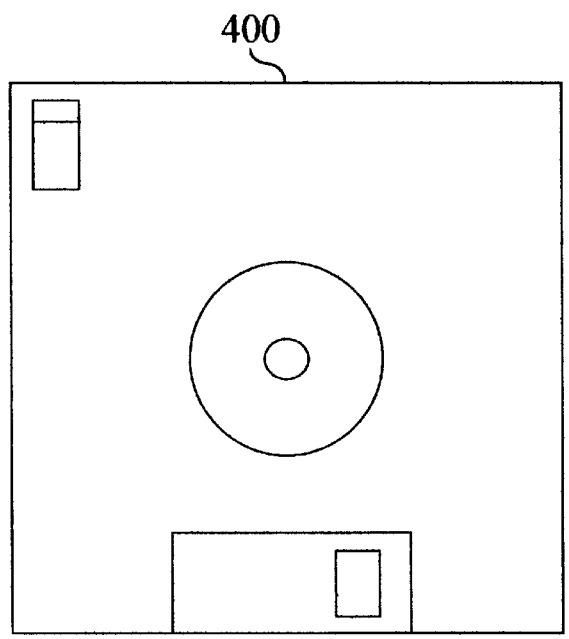
FIG. 4 is a diagram of an illustrative signal-bearing medium, in accordance with the invention.

This signal-bearing media may comprise, for example, RAM (not shown) contained within the manager 216 (FIG. 2), as represented by the fast-access storage 306 (FIG. 3). Alternatively, the instructions may be contained in another signal-bearing media, such as a magnetic data storage diskette 400 (FIG. 4), directly or indirectly accessible by the processor 302. Whether contained in the manager 216 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as C++, PLX, assembly language, etc.

Overall Sequence of Operation

Introduction

Figure 5:
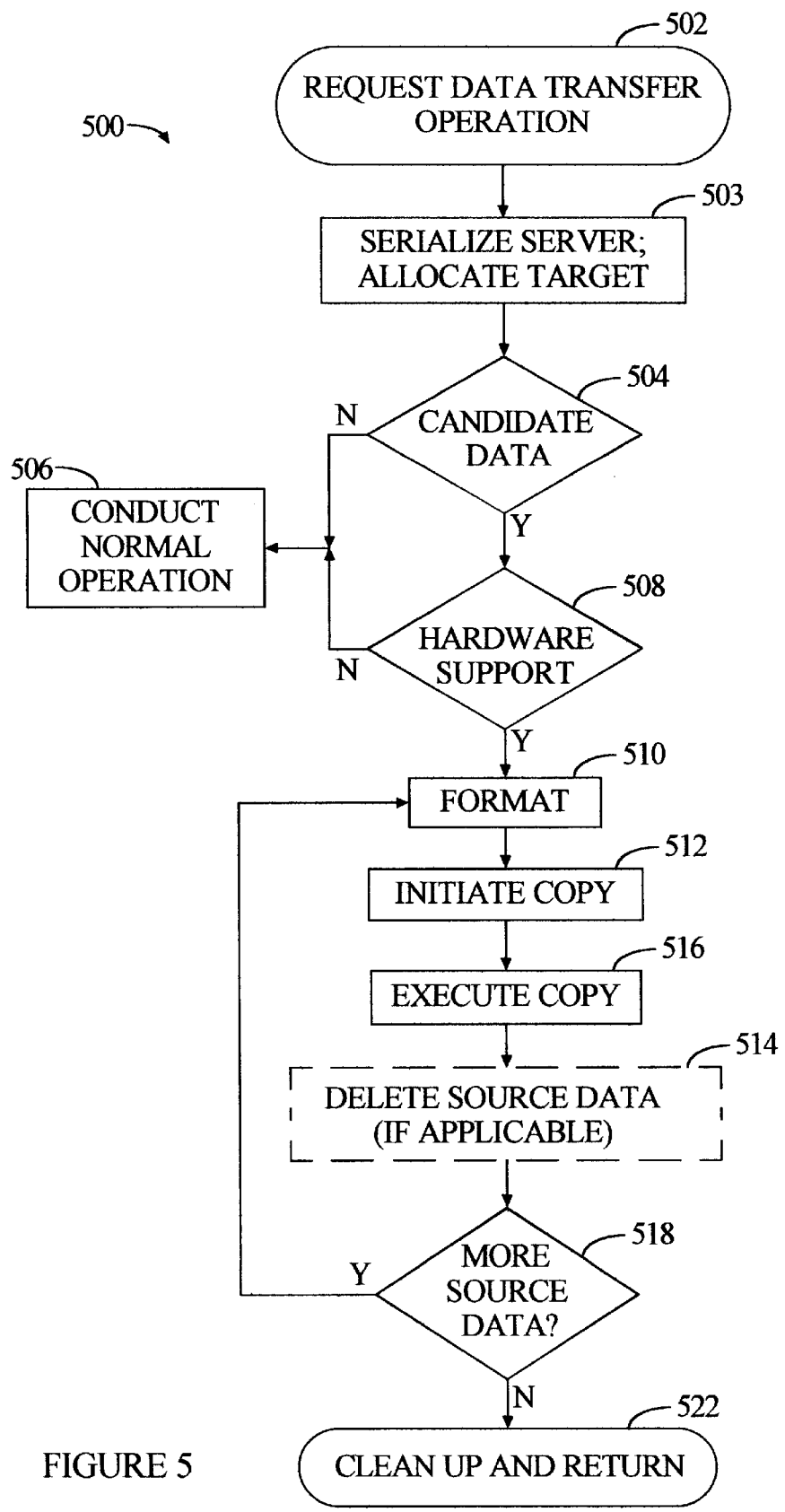
FIG. 5 is a flowchart showing an operational sequence for performing backup operations under control of an outboard data manager, in accordance with the invention.

FIG. 5 shows a sequence of method steps 500 to illustrate one example of the method aspect of the present invention. For ease of explanation, but without any limitation intended thereby, the example of FIG. 5 is described in the context of the data storage system 200 described above. The steps are initiated in step 502, when the host 202 generates a request to initiate a "data transfer operation." Data transfer operations include any copying, formatting, movement, or other transfer of data within one of the storage devices 206–207 or from one device to the other. Generally, a copy operation involves copying a source data set, where a move type operation involves making a copy of the source data set and also deleting the source data set. Some exemplary data transfer operations include data migrate, restore, recall, copy, move, defragment, reorganize, etc.

The request of step 502 may be generated in response to stimuli from the user input 210, or another computer, or a different source. Alternatively, the request may be generated by the host 202 without any external stimulus, such as according to a predefined schedule. The data transfer request generated by the host 502 identifies parameters such as (1) the type of operation (e.g., migrate, etc.) to be performed, (2) a group of data upon which to perform the requested operation ("source data," residing on a "source device"), (3) the format of the data as it will reside on the target device, and (4) the storage device where the data will be copied or moved ("target device").

Candidacy

Following step 502, the host 202 in step 503 serializes the source data and allocates the target storage. Importantly, serialization protects the source data, preventing other tasks from accessing the data before the data transfer operation completes. As an example, and as discussed in greater detail below, the host 202 may protect the source data using a technique such as "snap copy."

In step 504 the host 202 determines whether the identified source data is an appropriate candidate for use of the outboard data manager 216 to carry out the requested data transfer operation. The source data may be inappropriate for transfer by the outboard data manager 216 for a number of different reasons. Chiefly, the source data may be unsuitable if data characteristics require heightened supervision, control, or other presence of the host 202. Some examples include data sets that require format modification, re-blocking, or consistency checking, as well as data sets that are subject to an application utility agreement. If the source data is not appropriate for execution of the requested data transfer operation by the outboard data manager 216, the host 202 conducts the operation without assistance from the outboard data manager 216 as shown by step 506. As an example, step 506 may be performed by techniques that are well known in the applicable art.

Hardware Support

In contrast, if the source data is a suitable candidate, step 508 is performed. In step 508, the host 202 determines whether the necessary hardware support is available to perform the requested data transfer operation. Particularly, the host 202 queries the outboard data manager 216 to determine whether the manager 216 is accessible to the host 202, and whether the manager 216 has access to the source data and target storage device. In this context, "accessibility" concerns characteristics such as the availability ("busyness") of a machine's processor, availability of communication ports of the machine, availability of the communication links to/from the machine, etc. Step 508 is performed cooperatively by the host 202 and the outboard data manager 216. If step 508 finds that the necessary hardware support is not available, the data transfer operation is performed by the host 202 in step 506.

Commencing Data Transfer Operations

In contrast, if the necessary hardware is available, step 508 progresses to step 510. In steps 510–518, the data transfer operation is initiated and actually performed. Broadly, the host 202 serializes and supervises the data transfer operation by issuing commands to the outboard data manager 216. As discussed below, in one embodiment, the host 202 may additionally direct the target storage controllers to store certain information such as various metadata.

More particularly, step 510 stores format information on the target device in accordance with the particular type of data transfer operation (e.g., migrate, copy, etc.) and the target device characteristics (e.g., tape, tape format, magnetic disk, etc.). For example, in the case of a target device constituting a magnetic tape unit, step 510 may involve writing metadata such as header information of a known format to the tape storage device. In contrast, with a magnetic disk drive, step 510 may involve writing metadata such as a volume table of contents ("VTOC") to the disk drive, and also updating the catalog 212.

Illustratively, step 510 may be advantageously performed by the host 202, because the host 202 has access to information about the source data as stored in the catalog 212 and metadata 214. The duty of writing this format information does not substantially impinge upon the other processing tasks of the host 202. As an alternative, the host may generate the necessary format information using the catalog 212 and/or metadata 214, and then pass this information to the outboard data manager 216 for the manager 216 to write to the target device.

After step 510, the host 202 issues appropriate commands to direct the outboard data manager 216 to effect the data transfer operation, including copying of the source data from the source device to the target device. Generally, step 512 is performed by the host 202 transmitting a representation of the data transfer request to the outboard data manager 216. As mentioned above, contents of the data transfer request identify parameters such as:

1) The type of operation to be performed, e.g., migrate, move, copy, etc.
2) The source data, which may be identified, for example, by an "extent" parameter that includes the corresponding addresses.
3) The target storage device(s).

Performing Data Transfer—Copying Data

In response to step 512, the manager 216 in step 516 actually carries out the data transfer operation. Namely, the manager 216 retrieves the source data set from the source device and stores the data in the specified target device. This is achieved by the manager 216 sending appropriate commands to the controllers 204–205. In the specific example of FIG. 2, the source data passes from the source storage device to the source controller, then through the outboard data manager 216, and finally through the target controller to the target device. Depending upon the particular requirements of the application, the source data may be accumulated into a buffer (not shown) of the manager 216 prior to writing the data, or spooled into the buffer concurrently while data is also written to the target device, or routed through the outboard data manager 216 without any buffering. When the manager 216 confirms completion of the retrieval and copy operations, the manager 216 issues a confirmation message to the host 202, completing step 516.

Thus, as explained above, data transfer operations are performed without substantial host involvement. The actual work of retrieving, routing, and storing data is performed by the outboard data manager 216 with assistance from the source and target storage controllers and devices.

Treatment of Source Data

In step 514 (if applicable), the host 202 issues commands to the source storage controller to delete the source data. This is necessary if the data transfer operation is a migrate or move operation, for example. As an example, step 514 may be conditioned upon the host 202 receiving confirmation of a successful data copy from the data manager 216. In response to the host commands, the source storage controller carries out the deletion of source data from its storage device at an appropriate time (not shown).

Conclusion

After step 514, the host 202 determines whether there is any other data for which data transfer operations are pending. If so, control returns to step 510, which is performed for the next set of data, in the manner discussed above. If there are no pending data transfer operations, the host 202 performs any necessary cleanup operations and ends the routine 500 in step 522. Some exemplary cleanup operations include setting return codes indicating whether the request of step 502 ultimately succeeded or failed, and other procedures, which may be familiar to ordinarily skilled artisans.

As an alternative, instead of performing data transfer operations one data set at a time, a group of data sets may be processed at one time using a single request. In this embodiment, step 518 returns to step 502 to process an additional group of data sets.

Enhancement with Snap Copy

Optionally, the routine 500 may be enhanced by performing a "snap" copy of the source data. With snap copying, data records are copied by creating a duplicate data record pointer to reference the original data record. This enables access of the data record via two virtual addresses while only a single physical copy of the data record resides in the subsystem. In one embodiment, new data writes are performed to one of the virtual addresses, with the other address maintaining the original pointer. In an embodiment that incorporates snap copying, backup operations are performed from the original copy ("snap copy") rather than the freshly written updates. This provides faster release of the source data, enabling earlier updates to the source data without waiting for the backup operation to complete. "Snap copy" operations are discussed in greater detail in the following reference, which is incorporated herein by reference: U.S. Pat. No. 5,410,667 entitled "Data Record Copy System for a Disk Drive Array Data Storage Subsystem," issued on Apr. 25, 1995 to Belsan et al.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for managing data stored in a data storage subsystem that includes a host computer, one or more digital data storage devices, one or more device controllers attached between the host computer and the storage devices, and an outboard data manager coupled to the host and the device controllers, the method comprising:

the outboard data manager receiving a data transfer request from the host computer, the request identifying source data residing on one or more source devices among the storage devices, the request additionally identifying one or more target devices among the digital data storage devices; and in response to the request, the outboard data manager:

directing one or more source device controllers attached to the source devices to direct contents of the source data from the source devices to the outboard data manager via a data path independent of the host; and forwarding the contents of the source data from the outboard data manager to one or more target device controllers attached to the target devices via a data path independent of the host, and directing the target device controllers to store the forwarded contents of the source data in the target devices;

prior to the outboard data manager directing the target device controllers to store the transmitted copy in the target devices, the host computer transmitting metadata associated with the source data to the outboard data manager, and in response the outboard data manager transmitting the metadata to the target device controllers and instructing the target device controllers to store the metadata in the target devices.

2. The method of claim 1, further comprising the host directing the source device controllers to delete the source data.

3. The method of claim 1, where each device controller includes a processor and the outboard data manager comprises a processor distinct from the processors of the storage device controllers.

4. The method of claim 1, where each device controller includes a processor and the outboard data manager is implemented by one of the device controller processors executing a program of machine-readable instructions.

5. The method of claim 1, the data transfer request further identifying a data transfer operation type.

6. The method of claim 5, the operation type being one of the following: move, copy, migrate, recall, backup, restore, defragment, and reorganize.

7. The method of claim 1, further comprising the host serializing the source data during the data transfer operation.

8. An article of manufacture comprising a signal-bearing medium tangibly embodying a program of machine-readable instructions executable by a digital processing apparatus to perform a method for managing data stored in a data storage subsystem that includes a host computer, one or more digital data storage devices, one or more device controllers attached between the host computer and the storage devices, and an outboard data manager coupled to the host computer and the device controllers, the method comprising:

the outboard data manager receiving a data transfer request from the host computer, the request identifying source data residing on one or more source devices among the storage devices, the request additionally identifying one or more target devices among the storage devices; and in response to the request, the outboard data manager:

directing one or more source device controllers attached to the source devices to direct contents of the source data from the source devices to the outboard data manager via a data path independent of the host computer; and forwarding the contents of the source data from the outboard data manager to one or more target device controllers attached to the target devices via a data path independent of the host computer and directing the target device controllers to store the forwarded contents of the source data in the target devices;

prior to the outboard data manger directing the target device controllers to store the transmitted copy in the target devices, the outboard data manager receiving from the host computer metadata associated with the source data, and in response the outboard data manager transmitting the metadata to the target device controllers and instructing the target device controllers to store the metadata in the target devices.

9. The medium of claim 8, where each device controller includes a processor and the outboard data manager comprises a processor distinct from the processors of the storage device controllers.

10. The medium of claim 8, where each device controller includes a processor and the outboard data manager is implemented by one of the device controller processors executing a program of machine-readable instructions.

11. The medium of claim 8, the data transfer request further identifying a data transfer operation type.

12. The medium of claim 11, the operation type being one of the following: move, copy, migrate, recall, backup, restore, defragment, and reorganize.

13. A data storage subsystem, comprising:

a host computer;

multiple digital data storage devices;

one or more device controllers attached between the host computer and the digital data storage devices; and an outboard data manager coupled to the host computer and the device controllers, the outboard data manager being programmed to perform a method for transferring data stored in the storage devices, the method comprising:

the outboard data manager receiving a data transfer request from the host computer, the request identifying source data residing on one or more source devices among the storage devices, the request additionally identifying one or more target devices among the storage devices; and in response to the request, the outboard data manager:

directing one or more source device controllers attached to the source devices to direct contents of the source data from the source devices to the outboard data manager via a data path independent of the host computer; and forwarding the contents of the source data from the outboard data manager to one or more target device controllers attached to the target devices via a data path independent of the host computer and directing the target device controllers to store the forwarded contents of the source data in the target devices;

the host computer is programmed such that prior to the outboard data manager directing the target device controllers to store the transmitted copy in the target device, the host computer transmits to the outboard data manager metadata associated with the source data, and the outboard data manager is programmed such that, in response to receiving the metadata from the host computer, the outboard data manager transmits the metadata to the target device controller and instructs the target device controllers to store the metadata in the target device.

14. The subsystem of claim 13, the host being programmed to direct the source device controllers to delete the source data.

15. The subsystem of claim 13, where each device controller includes a processor and the outboard data manager comprises a processor distinct from the processors of the storage device controllers.

16. The subsystem of claim 13, where each device controller includes a processor and the outboard data manager is implemented by one of the device controller processors executing a program of machine-readable instructions.

17. The subsystem of claim 13, the data transfer request further identifying a data transfer operation type.

18. The subsystem of claim 17, the operation type being one of the following: move, copy, migrate, recall, backup, restore, defragment, and reorganize.

19. The subsystem of claim 13, the host being programmed to serialize the source data during the data transfer operation.

20. A data storage subsystem, comprising:

a host computer;

multiple digital data storage devices;

one or more device controllers attached between the host computer and the digital data storage devices; and an outboard data managing means, coupled to the host and the device controllers, for transferring data stored in the storage devices by:

the outboard data managing means receiving a data transfer request from the host, the request identifying source data residing on one or more source devices among the storage devices, the request additionally identifying one or more target devices among the digital data storage devices; and in response to the request, the outboard data managing means:

directing one or more source device controllers attached to the source devices to direct contents of the source data from the source devices to the outboard data managing means via a data path independent of the host computer; and forwarding the contents of the source data from the outboard data managing means to one or more target device controllers attached to the target devices via a data path independent of the host computer and directing the target device controllers to store the forwarded contents of the source data in the target devices; wherein the host computer is programmed such that prior to the outboard data managing means directing the target device controllers to store the transmitted copy in the target device, the host computer transmits to the outboard data managing means metadata associated with the source data, and the outboard data managing means is programmed such that, in response to receiving the metadata from the host computer, the outboard data managing means transmits the metadata to the target device controllers and instructs the target device controllers to store the metadata in the target device.

* * * * *

UNITED STATES PATENT AND TRADEMARK OFFICE
CERTIFICATE OF CORRECTION

PATENT NO. : 6,202,124 B1
DATED : March 13, 2001
INVENTOR(S) : Kern et al.

It is certified that error appears in the above-identified patent and that said Letters Patent is hereby corrected as shown below:

Claim 13,
Line 56, change "controller" to -- controllers --

Signed and Sealed this

Ninth Day of April, 2002

Attest:

Attesting Officer

JAMES E. ROGAN
Director of the United States Patent and Trademark Office